United States Patent
Hoshinoya et al.

(10) Patent No.: US 9,809,186 B2
(45) Date of Patent: Nov. 7, 2017

(54) VEHICLE

(71) Applicant: HONDA MOTOR CO., LTD., Tokyo (JP)

(72) Inventors: Takeshi Hoshinoya, Wako (JP); Shigeru Nakayama, Wako (JP); Hirotomi Nemoto, Wako (JP); Masahiko Akiyama, Wako (JP); Yuji Minoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/100,465

(22) PCT Filed: Dec. 2, 2014

(86) PCT No.: PCT/JP2014/081868
§ 371 (c)(1),
(2) Date: May 31, 2016

(87) PCT Pub. No.: WO2015/083700
PCT Pub. Date: Jun. 11, 2015

(65) Prior Publication Data
US 2016/0297385 A1    Oct. 13, 2016

(30) Foreign Application Priority Data

Dec. 2, 2013    (JP) .................................. 2013-249618

(51) Int. Cl.
*B60R 17/02*    (2006.01)
*B60K 1/02*    (2006.01)
(Continued)

(52) U.S. Cl.
CPC ................ *B60R 17/02* (2013.01); *B60K 1/02* (2013.01); *B60K 6/365* (2013.01); *B60K 6/383* (2013.01);
(Continued)

(58) Field of Classification Search
CPC ........ B60R 17/02; B60K 6/383; B60K 6/365; B60K 6/46; B60K 6/52; B60K 1/02;
(Continued)

(56) References Cited

U.S. PATENT DOCUMENTS 7,462,963 B2 * 12/2008 Ishihara .................... H02K 9/20
310/52
8,108,101 B2 * 1/2012 Murahashi .......... F16H 57/0434
180/339

(Continued)

FOREIGN PATENT DOCUMENTS

JP    59-34463 U    3/1984
JP    62-6487 U    1/1987
(Continued)

OTHER PUBLICATIONS

International Search Report dated Mar. 10, 2015, issued in counterpart International Application No. PCT/JP2014/081868, with English translation (5 pages).

(Continued)

*Primary Examiner* — Brian Swenson
*Assistant Examiner* — Jacob Meyer
(74) *Attorney, Agent, or Firm* — Westerman, Hattori, Daniels & Adrian, LLP

(57)    ABSTRACT

A vehicle including a housing supported on a framework member of the vehicle via a supporting member, a liquid medium supply unit fixed to the housing and driven by a motor to supply a liquid medium to a cooled or lubricated portion, and a first atmosphere communicating mechanism that establishes a communication between an inside of a motor portion of the liquid medium supply unit and atmosphere, the first atmosphere communicating mechanism including a volumetric member that is disposed apart from the liquid medium supply unit in a position higher than the (Continued)

liquid medium supply unit, that has a predetermined volumetric space, and that is fixed to the housing.

8 Claims, 13 Drawing Sheets

(51) Int. Cl.

| | | |
|---|---|---|
| *F16H 57/027* | (2012.01) | |
| *H02K 5/10* | (2006.01) | |
| *H02K 7/14* | (2006.01) | |
| *F16H 57/04* | (2010.01) | |
| *B60K 6/365* | (2007.10) | |
| *B60K 6/383* | (2007.10) | |
| *B60K 6/46* | (2007.10) | |
| *B60K 6/52* | (2007.10) | |
| *F04C 2/10* | (2006.01) | |
| *F04C 13/00* | (2006.01) | |
| *F04C 15/00* | (2006.01) | |
| *B60K 1/00* | (2006.01) | |
| *B60K 6/38* | (2007.10) | |

(52) U.S. Cl.
CPC ................. *B60K 6/46* (2013.01); *B60K 6/52* (2013.01); *F04C 2/102* (2013.01); *F04C 13/007* (2013.01); *F04C 15/008* (2013.01); *F16H 57/027* (2013.01); *F16H 57/0476* (2013.01); *H02K 5/10* (2013.01); *H02K 7/14* (2013.01); *B60K 2001/001* (2013.01); *B60K 2006/381* (2013.01); *B60Y 2200/92* (2013.01); *B60Y 2306/03* (2013.01); *B60Y 2306/05* (2013.01); *F04C 2240/40* (2013.01); *Y10S 903/91* (2013.01); *Y10S 903/913* (2013.01); *Y10S 903/916* (2013.01)

(58) Field of Classification Search
CPC ........ B60K 2006/381; B60K 2001/001; F04C 15/008; F04C 13/007; F04C 2/102; F04C 2240/40; F16H 57/0476; F16H 57/027; H02K 5/10; H02K 7/14; B60Y 2200/92; B60Y 2306/03; B60Y 2306/05; Y10S 903/91; Y10S 903/916; Y10S 903/913

See application file for complete search history.

(56) References Cited

U.S. PATENT DOCUMENTS

| | | | | |
|---|---|---|---|---|
| 8,155,834 | B2* | 4/2012 | Murahashi | B60B 11/06 180/339 |
| 8,485,289 | B2* | 7/2013 | Drum | F16N 7/40 180/62 |
| 8,727,052 | B2* | 5/2014 | Drum | B60B 35/16 180/55 |
| 8,894,542 | B2* | 11/2014 | Aoki | B60K 6/46 475/8 |
| 9,193,258 | B2* | 11/2015 | Hoshinoya | B60K 11/02 |
| 2005/0012387 | A1* | 1/2005 | Suzuki | F04C 2/102 303/116.4 |
| 2008/0099258 | A1* | 5/2008 | Berhan | B60K 6/405 180/65.22 |
| 2014/0096641 | A1* | 4/2014 | Hoshinoya | B60K 11/02 74/665 L |
| 2014/0097060 | A1* | 4/2014 | Hoshinoya | H02K 7/006 192/85.61 |

FOREIGN PATENT DOCUMENTS

| | | |
|---|---|---|
| JP | 4-12646 A | 1/1992 |
| JP | 5-15656 U | 2/1993 |
| JP | 7-28272 U | 5/1995 |
| JP | 09-048250 A | 2/1997 |
| JP | 2004-353537 A | 12/2004 |
| JP | 2012-257347 A | 12/2012 |
| JP | 2013-108514 A | 6/2013 |

OTHER PUBLICATIONS

Extended (supplementary) European Search Report dated Jun. 28, 2017, issued in counterpart European Patent Application No. 14868230.5.

* cited by examiner

VEHICLE

TECHNICAL FIELD

The present invention relates to a vehicle and more particularly to a vehicle including a liquid medium supply unit having a breather mechanism.

BACKGROUND ART

Conventionally, in a pump unit described in Patent Literature 1, as a breather construction for maintaining an internal pressure of a motor portion constant, an opening portion is provided in a pump portion to establish a communication between an inside and an outside of the motor portion. Additionally, the opening portion is covered with a cover to enhance the waterproofness.

PRIOR ART LITERATURE

Patent Literature

Patent Literature 1: JP-UM-A-S62-6487

SUMMARY OF THE INVENTION

Problem that the Invention is to Solve

Incidentally, in the breather construction of the pump unit described in Patent Literature 1, in the case of the pump unit being installed in a low position on the vehicle, the opening of the breather to the atmosphere is also positioned low, resulting in fears that the opening portion is submerged, thereby allowing water to enter the pump unit.

The invention provides a vehicle that can prevent the intrusion of water into a breather mechanism even in the event that a liquid medium supply unit is disposed at a lower portion of the vehicle.

Means for Solving the Problem

The invention provides the following aspects.

According to a first aspect, there is provided a vehicle (e.g., a vehicle 3 in embodiment) including:

a housing (e.g., a case 11 in embodiment), which accommodates at least any one of a power source (e.g., a first and second motors 2A, 2B in embodiment) of the vehicle and a power transmission mechanism (e.g., a first and second planetary gear type speed reducers 12A, 12B in embodiment) that is disposed on a power transmission path between a wheel (e.g., a left rear wheel LWr and a right rear wheel RWr in embodiment) of the vehicle and a power source of the vehicle; and a liquid medium supply unit (e.g., an electric oil pump 70 in embodiment), which is fixed to the housing and which is driven by a motor (e.g., motor 90 in embodiment) to supply a liquid medium to a cooled or lubricated portion that is at least either of a cooled portion (e.g., cooled portions A1, B1 in embodiment) or a lubricated portion (e.g., lubricated portions A2, B2 in embodiment) of the power source or a cooled portion or a lubricated portion (e.g., lubricated portions A3, B3 in embodiment) of the power transmission mechanism, wherein:

the liquid medium supply unit has a motor portion (e.g., a motor portion 85 in embodiment) that accommodates the motor, and a pressure feed portion (e.g., a pressure feed portion 87 in embodiment) that accommodates a pressure feed mechanism (e.g., a trochoid pump 86 in embodiment) driven by the motor;

the vehicle further includes a volumetric member (e.g., a breather box 140 in embodiment) that is disposed apart from the liquid medium supply unit in a position higher than the liquid medium supply unit and that has a predetermined volumetric space (e.g., a volumetric space VS in embodiment); and the volumetric space of the volumetric member is in communication with an inside of the motor portion of the liquid medium supply unit and in communication with atmosphere.

According to a second aspect, there is provided a vehicle (e.g., a vehicle 3 in embodiment) including:

a hydraulically driven disconnection/connection unit (e.g., a hydraulic brake 60 in embodiment), which is disposed on a power transmission path between a wheel (e.g., a left rear wheel LWr and a right rear wheel RWr in embodiment) of the vehicle and a power source (e.g., a first and second motors 2A, 2B in embodiment) of the vehicle, and which switches the power transmission path between a disconnected state and a connected state;

a housing (e.g., a case 11 in embodiment), which accommodates the disconnection/connection unit; and a liquid medium supply unit (e.g., an electric oil pump 70 in embodiment), which is fixed to the housing and which is driven by a motor (e.g., motor 90 in embodiment) to supply a liquid medium to a hydraulic chamber (e.g., a working chamber S in embodiment) of the disconnection/connection unit, wherein:

the liquid medium supply unit has a motor portion (e.g., a motor portion 85 in embodiment) that accommodates the motor and a pressure feed portion (e.g., a pressure feed portion 87 in embodiment) that accommodates a pressure feed mechanism (e.g., a trochoid pump 86 in embodiment) driven by the motor;

the vehicle further includes a volumetric member (e.g., a breather box 140 in embodiment) that is disposed apart from the liquid medium supply unit in a position higher than the liquid medium supply unit and that has a predetermined volumetric space (e.g., a volumetric space VS in embodiment); and the volumetric space of the volumetric member is in communication with an inside of the motor portion of the liquid medium supply unit and in communication with atmosphere.

In addition to the configuration according to the first or second aspect, a third aspect is characterized in that the volumetric member is fixed to the housing.

In addition to the configuration according to the third aspect, a fourth aspect is characterized in that:

the housing has a reservoir portion (e.g., a strainer accommodation portion 105 in embodiment), which reserves the liquid medium below an imaginary horizontal plane (e.g., an imaginary horizontal plane H in embodiment) that passes through a rotational axis of the power source or the power transmission mechanism; and the liquid medium supply unit is disposed below the imaginary horizontal plane; and the volumetric member is disposed above the imaginary horizontal plane.

In addition to the configurations according to the first to fourth aspects, a fifth aspect is characterized in that a porus film member (e.g., according to a porus film member 143 in embodiment) is interposed in an atmosphere communicating path (e.g., an atmosphere communicating mechanism 98, an atmosphere communicating mechanism 150 in embodiment) that is made up of the motor portion, the volumetric member and a communication member (e.g., a hose 151 in embodiment) allowing the motor portion to communicate with the volumetric member, the porus film member being configured to permit passage of gas but prohibit passage of liquid and solid.

In addition to the configuration according to the fifth aspect, a sixth aspect is characterized in that the porus film member is disposed within the volumetric member in the atmosphere communicating mechanism.

In addition to the configuration according to the sixth aspect, a seventh aspect is characterized in that:

the volumetric member has a first member (e.g., a case member 141 in embodiment) and a second member (e.g., a lid member 142 in embodiment), which are connected to each other to form the volumetric member; and the porus film member is held by the first member and the second member and divides the volumetric space into a motor portion side and an atmosphere side.

In addition to the configurations according to the first to seventh aspects, an eighth aspect is characterized in that:

the motor portion includes a main body accommodation portion (e.g., a main body accommodation portion 85a in embodiment) that accommodates a main body of the motor, and a control unit accommodation portion (e.g., a control unit accommodation member 85b in embodiment) that accommodates a control member (e.g., a control member 88 in embodiment) for the motor;

the main body accommodation portion and the control member accommodation portion communicate with each other via a communication hole (e.g., a communication hole 89 in embodiment); and an electric wire (e.g., an electric wire 91 in embodiment), which connects the main body of the motor with the control member, is disposed in the communication hole.

In addition to the configurations according to the first to eighth aspects, a ninth aspect is characterized in that the housing is disposed below a floor panel of the vehicle.

According to a tenth aspect, there is provided a vehicle (e.g., a vehicle 3 in embodiment) including:

a housing (e.g., a case 11 in embodiment), which accommodates at least any one of a power source (e.g., a first and second motors 2A, 2B in embodiment) of the vehicle and a power transmission mechanism (e.g., a first and second planetary gear type speed reducers 12A, 12B in embodiment) that is disposed on a power transmission path between a wheel (e.g., a left rear wheel LWr and a right rear wheel RWr in embodiment) of the vehicle and a power source of the vehicle; and a liquid medium supply unit (e.g., an electric oil pump 70 in embodiment), which is fixed to the housing and which is driven by a motor (e.g., motor 90 in embodiment) to supply a liquid medium to a cooled or lubricated portion that is at least either of a cooled portion (e.g., cooled portions A1, B1 in embodiment) or a lubricated portion (e.g., lubricated portions A2, B2 in embodiment) of the power source or a cooled portion or a lubricated portion (e.g., lubricated portions A3, B3 in embodiment) of the power transmission mechanism, wherein:

the liquid medium supply unit has a motor portion (e.g., a motor portion 85 in embodiment) that accommodates the motor, and a pressure feed portion (e.g., a pressure feed portion 87 in embodiment) that accommodates a pressure feed mechanism (e.g., a trochoid pump 86 in embodiment) driven by the motor; and the vehicle separately and independently includes: a first atmosphere communicating mechanism (e.g., an atmosphere communicating mechanism 150 in embodiment) that establishes a communication between an inside of the motor portion of the liquid medium supply unit and atmosphere; and a second atmosphere communicating mechanism (e.g., an atmosphere communicating mechanism 160 in embodiment) that establishes a communication between an inside of the housing and the atmosphere.

In addition to the configuration according to the tenth aspect, an eleventh aspect is characterized in that:

the housing is supported on a framework member (e.g., a subframe 13 in embodiment) of the vehicle via a supporting member (e.g., mount members 13a, 13b in embodiment);

the first atmosphere communicating mechanism is disposed apart from the inside of the motor portion of the liquid medium supply unit in a position higher than the motor portion and has a volumetric member (e.g., a breather box 140 in embodiment) having a predetermined volumetric space (e.g., a volumetric space VS in embodiment); and the volumetric member is fixed to the housing.

In addition to the configuration according to the tenth or eleventh aspect, a twelfth aspect is characterized in that a porus film member (e.g., a porus film member 143 in embodiment) is interposed only in the first atmosphere communicating mechanism among the first atmosphere communicating mechanism and the second atmosphere communicating mechanism, the porus film member being configured to permit passage of gas but prohibit passage of liquid and solid.

Advantage of the Invention

According to the first aspect, the volumetric space as the breather of the liquid medium supply unit is made up of the volumetric member that is disposed separately from the liquid medium supply unit in the upper position. This prevents the intrusion of water into the liquid medium supply unit in an ensured fashion and allows the volumetric space to be disposed in a more appropriate position.

According to the second aspect, the volumetric space as the breather of the liquid medium supply unit is made up of the volumetric member that is disposed separately from the liquid medium supply unit in the upper position. This prevents the intrusion of water into the liquid medium supply unit in an ensured fashion and allows the volumetric space to be disposed in a more appropriate position.

According to the third aspect, fixing the volumetric member to the housing allows the casing, the liquid medium supply unit and the volumetric member to be handled as an integral unit.

According to the fourth aspect, by disposing the reservoir portion in the lower position, more liquid medium can be recovered and reserved, and by disposing the liquid medium supply unit closer to the reservoir portion, the supply efficiency of liquid medium is improved. Additionally, the great difference in vertical position is produced between the liquid medium supply unit and the volumetric member, and this can also improve the function as the breather.

According to the fifth aspect, in addition to the prohibition of intrusion of liquid by the volumetric member alone, the porus film member can prohibit the intrusion of liquid and solid.

According to the sixth aspect, the porus film member is disposed in the volumetric member, and this enables the porus film member to be disposed in a closer position to the atmosphere, thereby making it possible to prohibit the intrusion of liquid and solid to the upstream side of the porus film member.

According to the seventh aspect, the porus film member is disposed in the volumetric member which is separate from the liquid medium supply unit and between the first and second members which make up the volumetric member, and this facilitates the fabrication and replacement of the porus film member.

According to the eighth aspect, the communication hole can be used commonly as the space through which air in the inside of the breather passes and the space where to lay out the electric wire.

According to the ninth aspect, the housing is disposed below the floor panel, and this enables the expansion of a passenger accommodation space and a loading space which are provided above the floor panel.

According to the tenth aspect, although the liquid medium supply unit is fixed to the casing, the function and performance that the housing requires on the atmosphere communicating mechanism differ from those that the liquid medium supply unit requires on the atmosphere communicating mechanism. Thus, by providing the first and second atmosphere communicating mechanisms separately and independently, the atmosphere communicating mechanisms can be given the required and sufficient functions and performances.

According to the eleventh aspect, the first atmosphere communicating mechanism can be handled as the integral part of the housing. Namely, when the housing is attached to or detached from the frame, the supporting member has to be dismounted and mounted, in which case there is not much advantage in integrating the second atmosphere communicating mechanism with the housing. However, the liquid medium supply unit is handled integrally with the casing, and therefore, there is much advantage in integrating the first atmosphere communicating mechanism with the casing for handling.

According to the twelfth aspect, the porus film member is interposed only in the first atmosphere communicating mechanism, and this can suppress the intrusion of liquid and solid by means of the porus film member. In addition, the first atmosphere communicating mechanism and the second atmosphere communicating mechanism are provided in parallel, and this can limit the number of porus film members to a required minimum.

MODE FOR CARRYING OUT THE INVENTION

Figure 1:
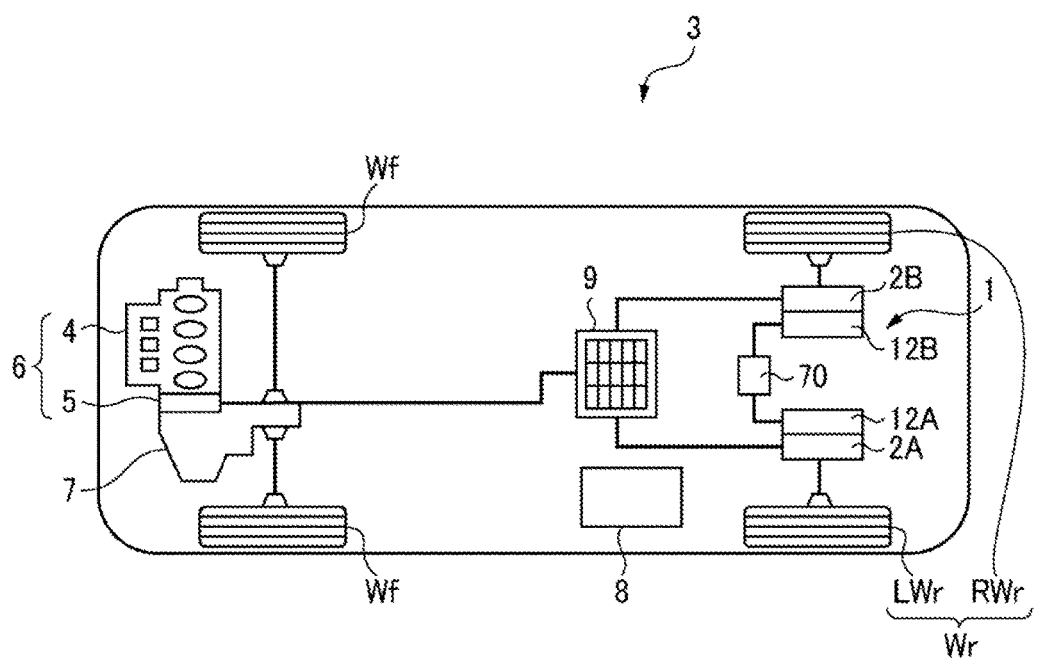
FIG. 1 is a block diagram showing a schematic configuration of a hybrid vehicle that is an embodiment of a vehicle according to the invention.

A vehicle driving system according to this embodiment employs motors as a drive source to drive wheels and is employed on a vehicle employing a driving system as shown in FIG. 1. In the following description, the vehicle driving system will be described as being used to drive rear wheels. However, the vehicle driving system may be used to drive front wheels.

A vehicle 3 shown in FIG. 1 is a hybrid vehicle having a driving system 6 (hereinafter, referred to as a "front wheel driving system") in which an internal combustion engine 4 and a motor 5 are connected in series at a vehicle front portion. Power of this front driving system 6 is transmitted to front wheels Wf by way of a transmission 7, while power of a driving system 1 (hereinafter, referred to as a "rear wheel driving system") which is provided separately from the front wheel driving system 6 at a vehicle rear portion is transmitted to rear wheels Wr (RWr, LWr). The motor 5 of the front wheel driving system 6 and a first and second motors 2A, 2B of the rear wheel driving system 1 are connected to a battery 9, so that electric power can be supplied from the battery 9 to the motors while energy produced at the front and rear wheel driving systems 5, 6 can be recovered to the battery 9. In FIG. 1, reference numeral 8 denotes a controller configured to perform various controls for the whole of the vehicle.

Firstly, a vehicle driving system according to an embodiment of the invention will be described based on FIGS. 2 to 11.

Figure 2:
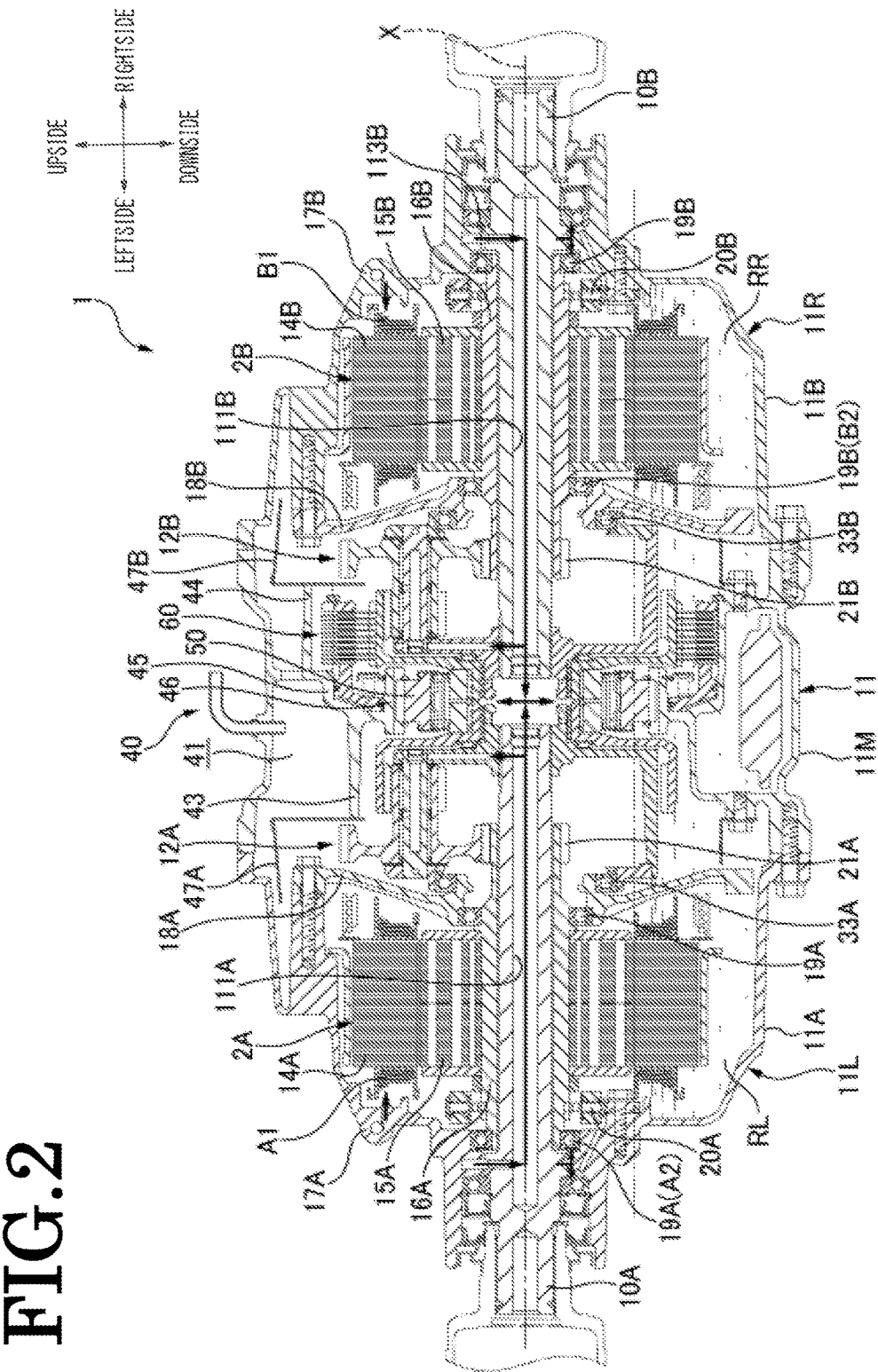
FIG. 2 is a vertical longitudinal sectional view of a rear wheel driving system according to the embodiment.
Figure 3:
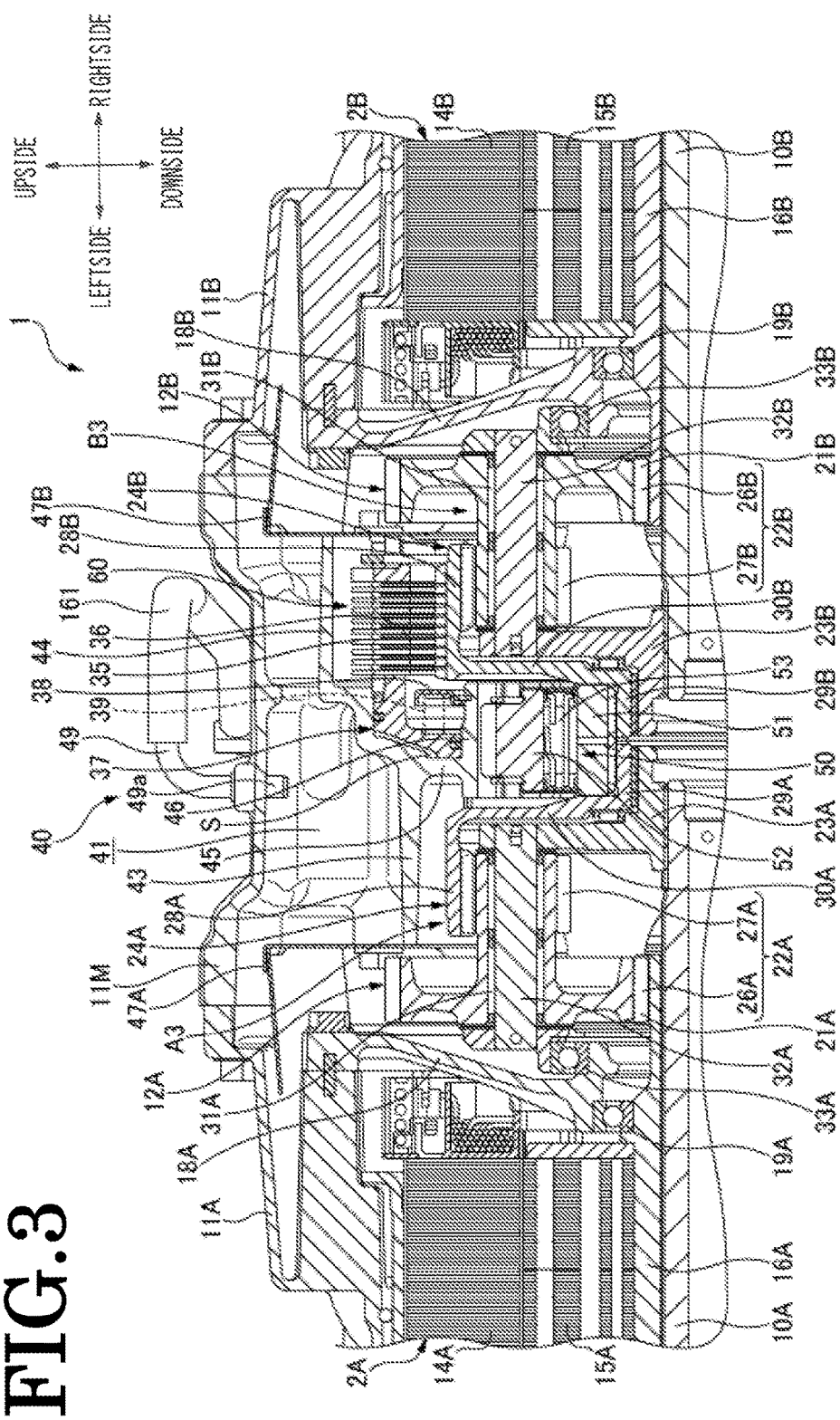
FIG. 3 is an enlarged sectional view of an upper portion of the rear wheel driving system shown in FIG. 2.

FIG. 2 is a vertical longitudinal sectional view of the whole of the rear wheel driving system 1, and FIG. 3 is an enlarged sectional view of an upper portion of FIG. 2. In those figures, reference numeral 11 denotes a case for the rear wheel driving system 1 and includes a central case 11M which is disposed at a substantially central portion in a vehicle's width direction, and side cases 11A, 11B which are disposed on left and right sides of the central case 11M so as to sandwich the central case 11M therebetween. The case 11 has a substantially cylindrical shape as a whole. In an inside of the case 11, axles 10A, 10B for the rear wheels Wr, the first and second motors 2A, 2B as a drive source for driving the axles, and a first and second planetary gear type speed reducers 12A, 12B as a power transmission mechanism, which are disposed on a power transmission path between the rear wheels LWr, RWr and the first and second motors 2A, 2B and which decelerate the driving rotations of the first and second motors 2A, 2B are disposed so as to be aligned with one another on the same axis. The axle 10A, the first motor 2A and the first planetary gear type speed reducer 12A control to drive the left rear wheel LWr, and the axle 10B, the second motor 2B and the second planetary gear type speed reducer 12B control to drive the right rear wheel RWr. The axle 10A, the first motor 2A and the first planetary gear type speed reducer 12A are disposed symmetrical laterally with the axle 10B, the second motor 2B and the second planetary gear type speed reducer 12B in the vehicle's width direction within the case 11. The left rear wheel LWr is positioned opposite to the first planetary gear type speed reducer 12A with respect to the first motor 2A, and the right rear wheel RWr is also positioned opposite to the second planetary gear type speed reducer 12B with respect to the second motor 2B. The first motor 2A and the first planetary gear type speed reducer 12A are disposed in this order from a transversely outer side of the vehicle, while the second motor 2B and the second planetary gear type speed reducer 12B are disposed in this order form a transversely outer side of the vehicle. Thus, the first and second planetary gear type speed reducers 12A, 12B are disposed between the first and second motors 2A, 2B.

Figure 4:
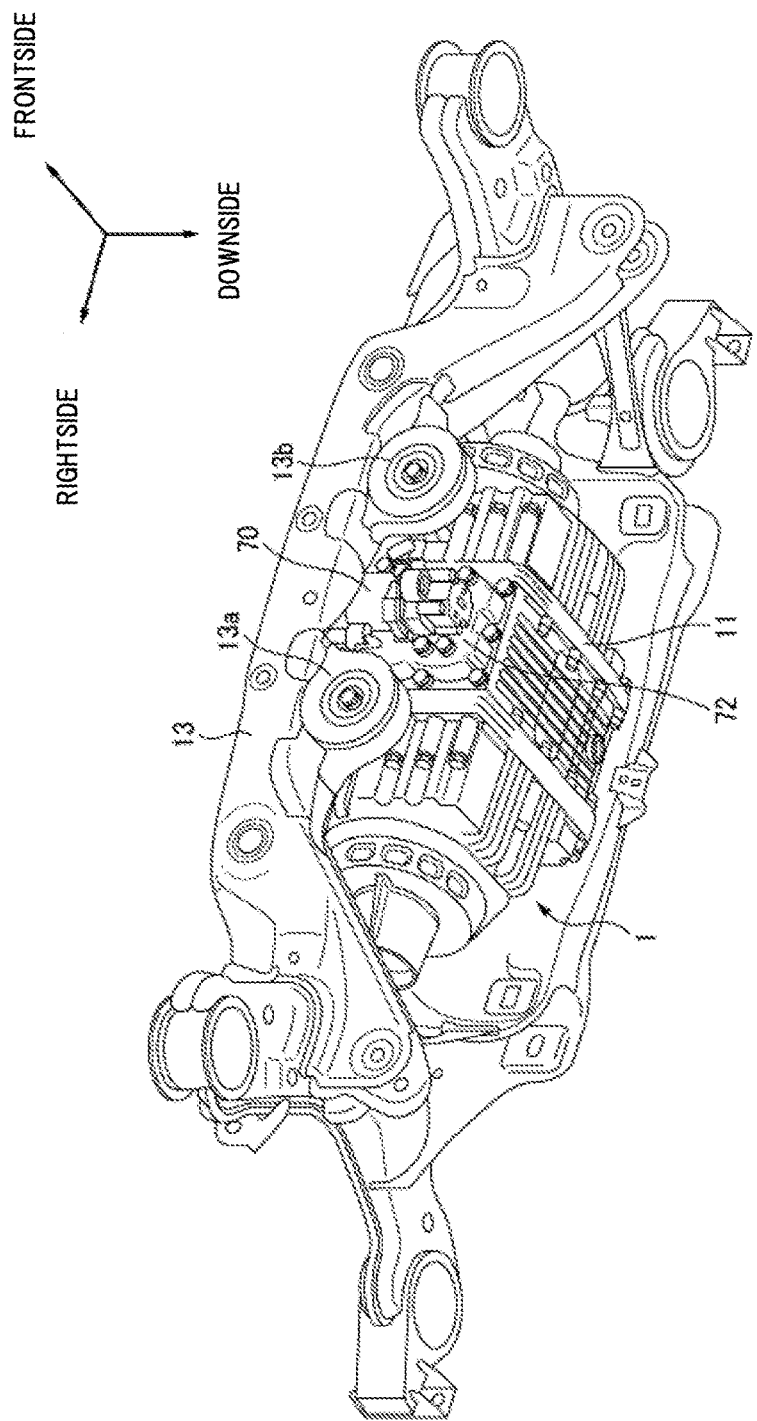
FIG. 4 is a perspective view showing a state in which a vehicle driving system shown in FIG. 1 is mounted on a frame.

Partition walls 18A, 18B which extend radially inwards are provided individually on sides of the side cases 11A, 11B which face the central case 11M. The first and second motors 2A, 2B are disposed between the side cases 11A, 11B and the partition walls 18A, 18B respectively. Additionally, the first and second planetary gear type speed reducers 12A, 12B are disposed within a space which is surrounded by the central case 11M and the partition walls 18A, 18B. As shown in FIG. 2, in this embodiment, the left side case 11A and the central case 11M define a first case 11L which accommodates the first motor 2A and the first planetary gear type speed reducer 12A, and the right side case 11B and the central case 11M define a second case 11R which accommodates the second motor 2B and the second planetary gear type speed reducer 12B. Then, the first case 11L has a left reservoir portion RL which reserves oil as a liquid medium which is provided to lubricate and/or cool at least one of the first motor 2A and the first planetary gear type speed reducer 12A. The second case 11R has a right reservoir portion RR which reserves oil which is provided to lubricate and/or cool at least one of the second motor 2B and the second planetary gear type speed reducer 12B. As shown in FIG. 4, the case 11 is supported on a subframe 13, which is a framework member of the vehicle, by mount members 13a, 13b which are a pair of supporting members and is fixed below a floor panel (not shown) of the vehicle via the subframe 13. The rear wheel driving system 1 is supported on the vehicle 3 by fixing the mount members 13a, 13b to boss portions 11a (refer to FIG. 5) which are formed so as to project to the front from a front side surface 11f of the case 11 (the side cases 11A, 11B). Arrows in FIGS. 2 to 11 denote directions in relation to the rear wheel driving system 1 which is mounted on the vehicle properly.

In the rear wheel driving system 1, a breather unit 40 that establishes a communication between the inside and the outside of the case 11 is provided, so that air in the inside of the case 11 is released to the outside by way of a breather chamber 41 so as to prevent the air from being extremely heated to high temperatures or being extremely pressurized to high pressures in the inside of the case 11. The breather chamber 41 is disposed at a vertically upper portion in the case 11 and is made up of a space that is defined by an external wall of the central case 11M, a first cylindrical wall 43 that is provided in the central case 11M so as to extend substantially horizontally towards a left side case 11A, a second cylindrical wall 44 that is provided in the central case 11M so as to extend substantially horizontally towards the right side case 11B, a left and right dividing wall 45 that connects together inner end portions of the first and second cylindrical walls 43, 44, a baffle plate 47A mounted so as to be brought into abutment with a distal end portion of the first cylindrical wall 43 that faces the left side case 11A, and a baffle plate 47B mounted so as to be brought into abutment with a distal end portion of the second cylindrical wall 44 that faces the right side case 11B.

In the first and second cylindrical walls 43, 44 and the left and right dividing wall 45 that define a lower surface of the breather chamber 41, the first cylindrical wall 43 is situated further radially inwards than the second cylindrical wall 44, and the left and right dividing wall 45 extends to the inner end portion of the first cylindrical wall 43 while bending so as to be radially contracted in diameter from the inner end portion of the second cylindrical wall 44 and extends further radially inwards to reach a third cylindrical wall 46 that extends substantially horizontally. The third cylindrical wall 46 is situated further inwards than outer end portions of both the first cylindrical wall 43 and the second cylindrical wall 44 and substantially in the center therebetween.

In the central case 11M, the baffle plates 47A, 47B are fixed so as to divide a space defined between the first cylindrical wall 43 and an external wall of the central case 11M or a space defined between the second cylindrical wall 44 and the external wall of the central case 11M from the first planetary gear type speed reducer 12A or the second planetary gear type speed reducer 12B, respectively.

As shown in FIGS. 3 and 9 to 11, an externally communicating pipe 49 that establishes a communication between the breather chamber 41 and the outside of the case 11 is fitted in an upper surface of the central case 11M that lies vertically above the breather chamber 41. A breather chamber side end portion 49a of the externally communicating pipe 49 is disposed so as to be directed vertically downwards. Consequently, oil is restrained from being discharged to the outside through the externally communicating pipe 49.

This externally communicating pipe 49 is connected to a hose 161 and makes up an atmosphere communicating mechanism (hereinafter, the "atmosphere communicating mechanism" will also be referred to as an atmosphere communicating path or a breather) 160 that establishes a communication between the inside of the case 11 and the atmosphere together with the hose 161. A distal end 161a of the hose 161 is fixedly inserted into a hollow portion having a closed section of the subframe 13, although not shown, to communicate with the atmosphere in the subframe 13.

In the first and second motors 2A, 2B, stators 14A, 14B are fixed to the side cases 11A, 11B, respectively, and annular rotors 15A, 15B are disposed rotatably on inner circumferential sides of the stators 14A, 14B, respectively. Cylindrical shafts 16A, 16B which surround outer circumferences of the axles 10A, 10B, respectively, are connected to inner circumferential portions of the rotors 15A, 15B, respectively, and the cylindrical shafts 16A, 16B are supported on end walls 17A, 17B of the side cases 11A, 11B and the partition walls 18A, 18B via bearings 19A, 19B so as to rotate relative to the axles 10A and 10B concentrically therewith. Additionally, resolvers 20A, 20B, which are configured to feed back information on rotational positions of the rotors 15A, 15B to a controller (not shown) that controls the first and second motors 2A, 2B, are provided at portions of the end walls 17A, 17B that are situated on outer circumferences of end portions of the cylindrical shafts 16A, 16B. The first and second motors 2A, 2B which include the stators 14A, 14B and the rotors 15A, 15B have the same diameter. Rotational axes of the first and second motors 2A, 2B are disposed on the same axis X (hereinafter, reference character X is given as a rotational axis X). The first and second motors 2A, 2B are disposed mirror symmetrical with each other. The axle 10A and the cylindrical shaft 16A penetrate through an inside of the first motor 2A to extend from both end portions of the first motor 2A. The axle 10B and the cylindrical shaft 16B also penetrate through an inside of the second motor 2B to extend from both end portions of the second motor 2B.

The first planetary gear type speed reducer 12A that is disposed on the power transmission path between the left rear wheel LWr and the first motor 2A and the second planetary gear type speed reducer 12B that is disposed on the power transmission path between the right rear wheel RWr and the second motor 2B include sun gears 21A, 21B, ring gears 24A, 24B that are situated on outer circumferential sides of the sun gears 21A, 21B, pluralities of planetary gears 22A, 22B that mesh with the sun gears 21A, 21B and the ring gears 24A, 24B, and planetary carriers 23A, 23B that support the planetary gears 22A, 22B. Driving forces of the first and second motors 2A, 2B are inputted from the sun gears 21A, 21B, and the decelerated driving forces are outputted from the axles 10A, 10B through the planetary carriers 23A, 23B.

The sun gears 21A, 21B are formed integrally on the cylindrical shafts 16A, 16B, respectively. Additionally, the planetary gears 22A, 22B are double pinions having first pinions 26A, 26B that are greater in diameter and which mesh directly with the sun gears 21A, 21B and second pinions 27A, 27B that are smaller in diameter than the first pinions 26A, 26B. The first pinions 26A, 26B and the second pinions 27A, 27B are formed integrally so as not only to be concentric but also to be offset in an axial direction. The planetary gears 22A, 22B are supported on pinion shafts 32A, 32B of the planetary carriers 23A, 23B via needle bearings 31A, 31B. Axial inner end portions of the planetary carriers 23A, 23B extend radially inwards and are spline fitted on the axle shafts 10A, 10B, whereby the planetary carriers 23A, 23B are supported on the axle shafts 10A, 10B so as to rotate together. The planetary carriers 23A, 23B are also supported on the partition walls 18A, 18B via bearings 33A, 33B.

The ring gears 24A, 24B include gear portions 28A, 28B that mesh with the second pinion gears 27A, 27B, which are smaller in diameter, on inner circumferential surfaces thereof, small diameter portions 29A, 29B which are smaller in diameter than the gear portions 28A, 28B and which are disposed so as to face each other in a middle position of the case 11, and connecting portions 30A, 30B which connect axial inner end portions of the gear portions 28A, 28B and axial outer end portions of the small diameter portions 29A, 29B together in a radial direction.

The gear portions 28A, 28B face each other in the axial direction in such a way as to sandwich therebetween the third cylindrical wall 46 which is formed at a radially inner end portion of the left and right dividing wall 45 of the central case 11M. The small diameter portions 29A, 29B spline fit in inner races 51 of a one-way clutch 50, which will be described later, on outer circumferential surfaces thereof, and the ring gears 24A, 24B are connected to each other so as to rotate together with the inner races 51 of the one-way clutch 50.

A hydraulic brake 60, which is connected to the ring gear 24B to make up a brake unit, is disposed between the second cylindrical wall 44 of the central case 11M which makes up the case 11 and the gear portion 28B of the ring gear 24B on the second planetary gear type speed reducer 12B side in such a way as to overlap the first pinion 26B in the radial direction and to overlap the second pinion 27B in the axial direction. In the hydraulic brake 60, a plurality of fixed plates 35 which are spline fitted in an inner circumferential surface of the second cylindrical wall 44 and a plurality of rotational plates 36 which are spline fitted on an outer circumferential surface of the gear portion 28B of the ring gear 24B are disposed alternately in the axial direction, and these plates 35, 36 are operated to be applied and released by an annular piston 37. The piston 37 is accommodated in an annular cylinder chamber defined between the left and right dividing wall 45 and the third cylindrical wall 46 in the central case 11M so as to reciprocate freely therein. Further, the piston 37 is biased in a direction in which the fixed plates 35 and the rotational plates 36 are released at all times by an elastic member 39 which is supported by a bearing seat 38 provided on an outer circumferential surface of the third cylindrical wall 46.

To describe this in greater detail, a space defined between the left and right dividing wall 45 and the piston 37 makes up a working chamber S into which oil is directly introduced. When the pressure of the oil which is introduced into the working chamber S overcomes the biasing force of the elastic member 39, the piston 37 moves forwards (rightwards), and the fixed plates 35 and the rotational plates 36 are pressed against each other to be applied. On the other hand, when the biasing force of the elastic member 39 overcomes the pressure of the oil which is introduced into the working chamber S, the piston 37 moves backwards (leftwards), and the fixed plates 35 and the rotational plates 36 are separated to be released. The hydraulic brake 60 is connected to an electric oil pump 70 (refer to FIG. 4) acting as a liquid medium supply unit.

In the case of this hydraulic brake 60, the fixed plates 35 are supported on the second cylindrical wall 44 which extends from the left and right dividing wall 45 of the central case 11M which makes up the case 11, while the rotational plates 36 are supported on the gear portion 28B of the ring gear 24B. Therefore, when both the plates 35, 36 are pressed against each other by the piston 37, the plates 35, 36 are brought into frictional engagement with each other, whereby a braking force acts on the ring gear 24B to thereby be fixed. When the application of the hydraulic brake 60 by the piston 37 is released from that state, the ring gear 24B is permitted to rotate freely. Since the ring gears 24A, 24B are connected to each other as described above, when the hydraulic brake 60 is applied, the braking force also acts on the ring gear 24A to thereby fix the ring gear 24A, whereas when the hydraulic brake 60 is released, the ring gear 24A is also permitted to rotate freely.

A space portion is also ensured between the connecting portions 30A, 30B of the ring gears 24A, 24B which face each other in the axial direction. The one-way clutch 50 is disposed within the space portion, the one-way clutch 50 being configured to transmit power to the ring gears 24A, 24B only in one direction and to cut off power acting in the other direction. The one-way clutch 50 includes a large number of sprags 53 which are interposed between the inner races 51 and an outer race 52, and the inner races 51 rotate together with the small diameter portions 29A, 29B of the ring gears 24A, 24B through spline fitting. In addition, the outer race 52 is positioned by the third cylindrical wall 46 and is prevented from rotating thereby.

The one-way clutch 50 is applied to lock the rotation of the ring gears 24A, 24B when the vehicle 3 travels forwards by means of the power of the first and second motors 2A, 2B. To describe this in greater detail, the one-way clutch 50 is applied when the rotational power of the first and second motors 2A, 2B in a forward direction (a rotational direction when causing the vehicle 3 to travel forwards) is inputted into the rear wheels Wr, while the one-way clutch 50 is released when the rotational power of the first and second motors 2A, 2B in a reverse direction is inputted into the rear wheels Wr. The one-way clutch 50 is released when the rotational power of the rear wheels Wr in the forward direction is inputted into the first and second motors 2A, 2B side, while the one-way clutch 50 is applied when the rotational power of the rear wheels Wr in the reverse direction is inputted into the first and second motors 2A, 2B.

In the rear wheel driving system 1 of this embodiment configured as has been described heretofore, the one-way clutch 50 and the hydraulic brake 60 are disposed in parallel on a power transmission path between the first and second motors 2A, 2B and the rear wheels Wr. Here, the hydraulic brake 60 is controlled to be put in a released state, a weakly applied state, or an applied state by the pressure of oil supplied from the electric oil pump 70 in accordance with the traveling state of the vehicle or whether the one-way clutch 50 is applied or released. For example, when the vehicle 3 travels forwards (at low vehicle speeds or middle vehicle speeds) by means of the power driving of the first and second motors 2A, 2B, the one-way clutch 50 is applied, allowing for power transmission. However, since the hydraulic brake 60 is controlled to be applied weakly, the input of forward rotational power from the first and second motors 2A, 2B is reduced temporarily to thereby release the one-way clutch 50. However, even in such a case, the disconnection of power transmission between the first and second motors 2A, 2B and the rear wheels Wr is suppressed. Additionally, when the vehicle 3 travels forwards by the internal combustion engine 4 and/or the power driving of the motor 5 (at high vehicle speeds), the one-way clutch 50 is disengaged, and the hydraulic brake 60 is controlled to be released, whereby the over-revolution of the first and second motors 2A, 2B is prevented. On the other hand, when the vehicle 3 is reversed or is decelerated to regenerate energy, the one-way clutch 50 is disengaged. Due to this, as a result of the hydraulic brake 60 being controlled to be applied, the reverse rotational power is outputted to the rear wheels Wr from the first and second motors 2A, 2B, or the forward rotational power of the rear wheels Wr is inputted into the first and second motors 2A, 2B.

Figure 5:
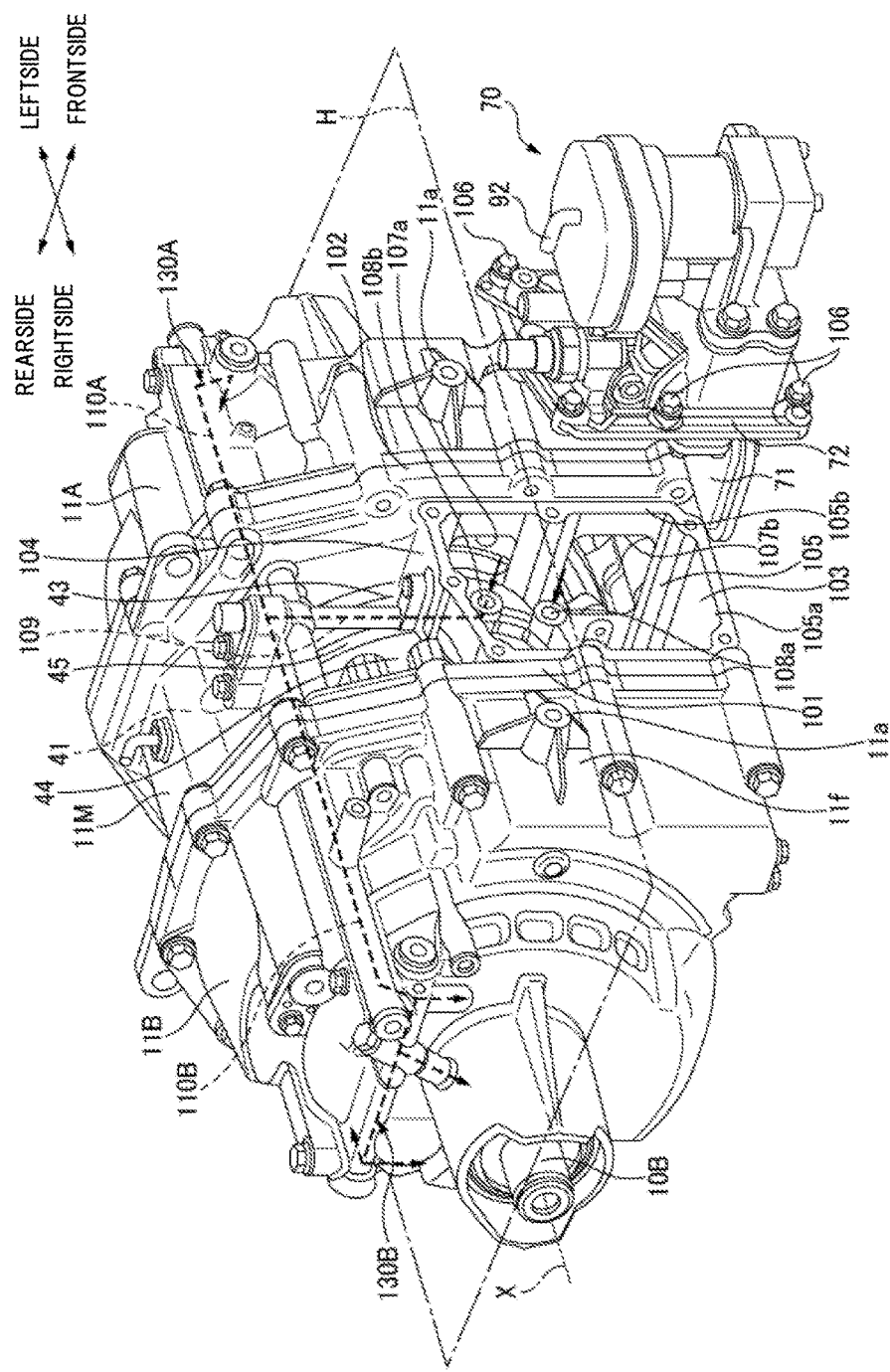
FIG. 5 is an external perspective view of the rear wheel driving system from which an electric oil pump is removed.

As shown in FIG. 5, the outer circumferential surfaces of the first and second cylindrical walls 43, 44 and the left and right dividing wall 45 of the central case 11 are exposed to the outside excluding the portions that make up the breather chamber 41. A pair of projecting portions 101, 102 are formed on the outer circumferential surfaces of the first and second cylindrical walls 43, 44 and the left and right dividing wall 45 so as to project radially from axial end portions thereof.

On the periphery of the first and second cylindrical walls 43, 44 and the left and right dividing wall 45, a substantially quadrangularly cylindrical strainer accommodation chamber 105 is formed obliquely forwards and downwards of the first and second cylindrical walls 43, 44 and the left and right dividing wall 45 by the pair of projecting portions 101, 102, a bottom wall 103 and an upper wall 104. This strainer accommodation chamber 105 accommodates a strainer 71, which will be described later, and functions as a reservoir portion where oil is reserved. Through holes 107a, 107b and through holes, not shown, are formed in the pair of projecting portions 101, 102 which define the strainer accommodation chamber 105. The through holes 107a, 107b establish a communication between a left reservoir portion RL and the strainer accommodation chamber 105. The through holes, not shown, establish a communication between a right reservoir portion RR and the strainer chamber 105. By providing the through holes, the left reservoir portion RL and the right reservoir portion RR communicate with each other via the strainer chamber 105.

The pair of projecting portions 101, 102, the bottom wall 103 and a distal end face of the upper wall 104 which make up the strainer accommodation chamber 105 constitute a lid member fixing portion 105b and define an outer edge of a front opening portion 105a that opens towards an outer side. The front opening portion 105a of the strainer accommodation chamber 105 is closed by a lid member 72 that is attached to the electric oil pump 70. A case fixing portion 72a having a substantially quadrangular end face is provided on the lid member 72 in a position that faces the lid member fixing portion 105b of the case 11.

Figure 6A:
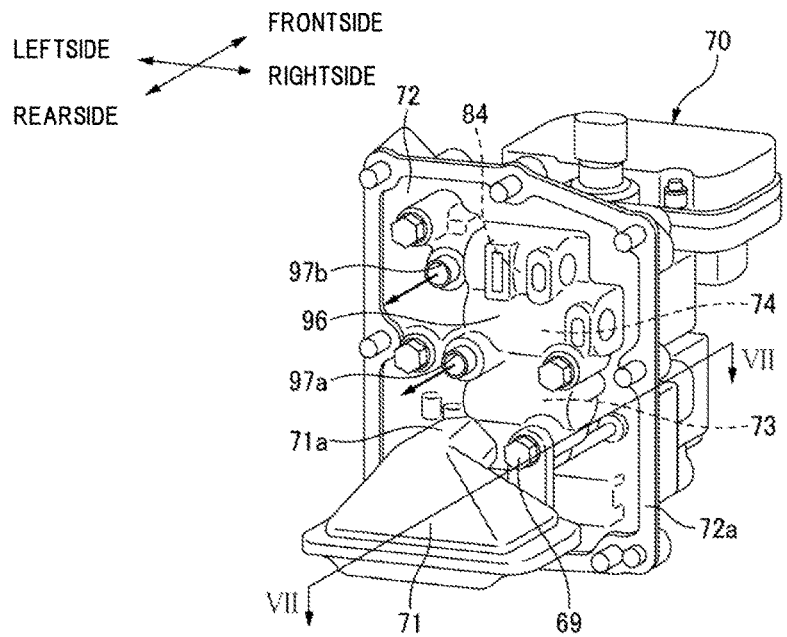
FIG. 6A is a perspective view of a lid member on which the electric oil pump is mounted as seen from an inner side thereof.
Figure 6B:
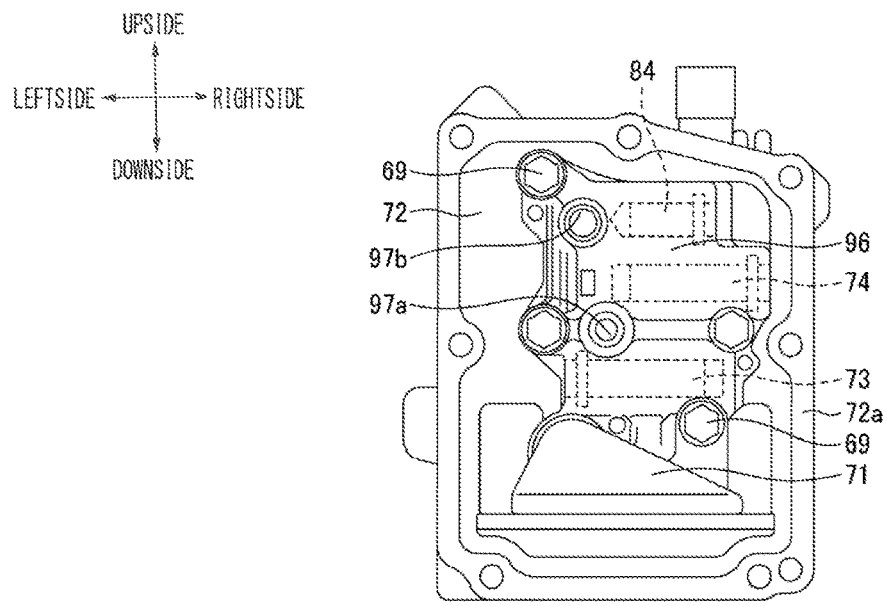
FIG. 6B is a front view of the lid member on which the electric oil pump is mounted as seen from the inner side thereof.

As shown in FIGS. 5, 6A and 6B, the electric oil pump 70 is mounted on the front opening portion 105a of the strainer accommodation chamber 105 by fixedly fastening the case fixing portion 72a formed on the lid member 72 and the lid member fixing portion 105b formed at the front opening portion 105a of the strainer chamber 105 with a plurality of bolts 106 together. Consequently, the electric oil pump 70 is mounted on the lid member 72 so as to be disposed further outwards of the case 11 than the lid member 72 with the lid member 72 mounted on the case 11 to close the front opening portion 105a to thereby close the strainer accommodation chamber 105 or the case 11. With the case 11 closed in the way described above, an oil path forming cover 96 as a flow path forming member is provided detachably on the lid member 72 further inwards of the case than the lid member 72 and is fixed to the lid member 72 with bolts 69. The oil path forming cover 96 defines part of oil paths of a hydraulic circuit together with the lid member 72. A low pressure oil path selector valve 73, a brake oil path selector valve 74 and a relief valve 84 are disposed sequentially in that order from the bottom between the lid member 72 and the oil path forming cover 96. A solenoid valve (not shown) is mounted on an opposite side of the lid member 72 to the side where the oil path forming cover 96 is provided. When energized, the solenoid valve connects or disconnects a pilot oil path that is provided between the low pressure oil path selector valve 73 and the brake oil path selector valve 74.

An outlet port 71a of the strainer 71 is inserted into the lid member 72, and the strainer 71 is fastened to the lid member 72 together with the oil path forming cover 96 with the bolt 69 with which the oil path forming cover 96 is fastened to the lid member 72, whereby the strainer 71 is fixed detachably only to the lid member 72. The strainer 71 removes foreign matters in oil inhaled from an inlet port provided in a lower surface of the strainer 71, and the oil from which the foreign matters are removed is sent to the electric oil pump 70.

Figure 7:
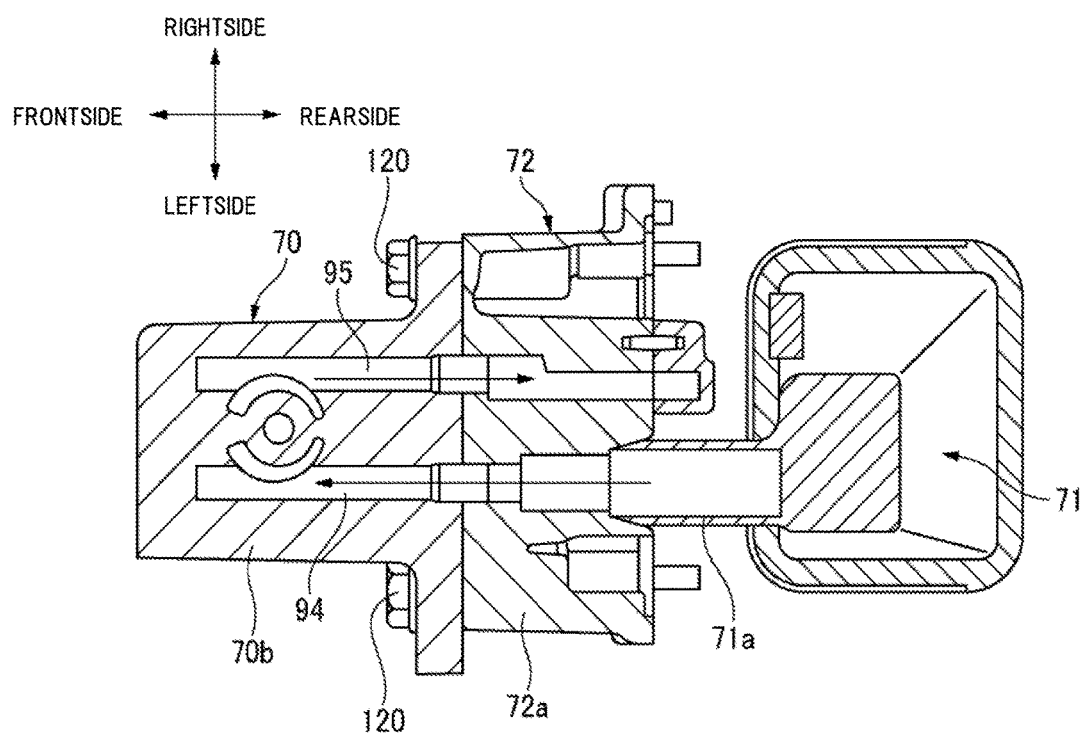
FIG. 7 is a sectional view of the electric oil pump taken along a line VII-VII in FIG. 6A.
Figure 8:
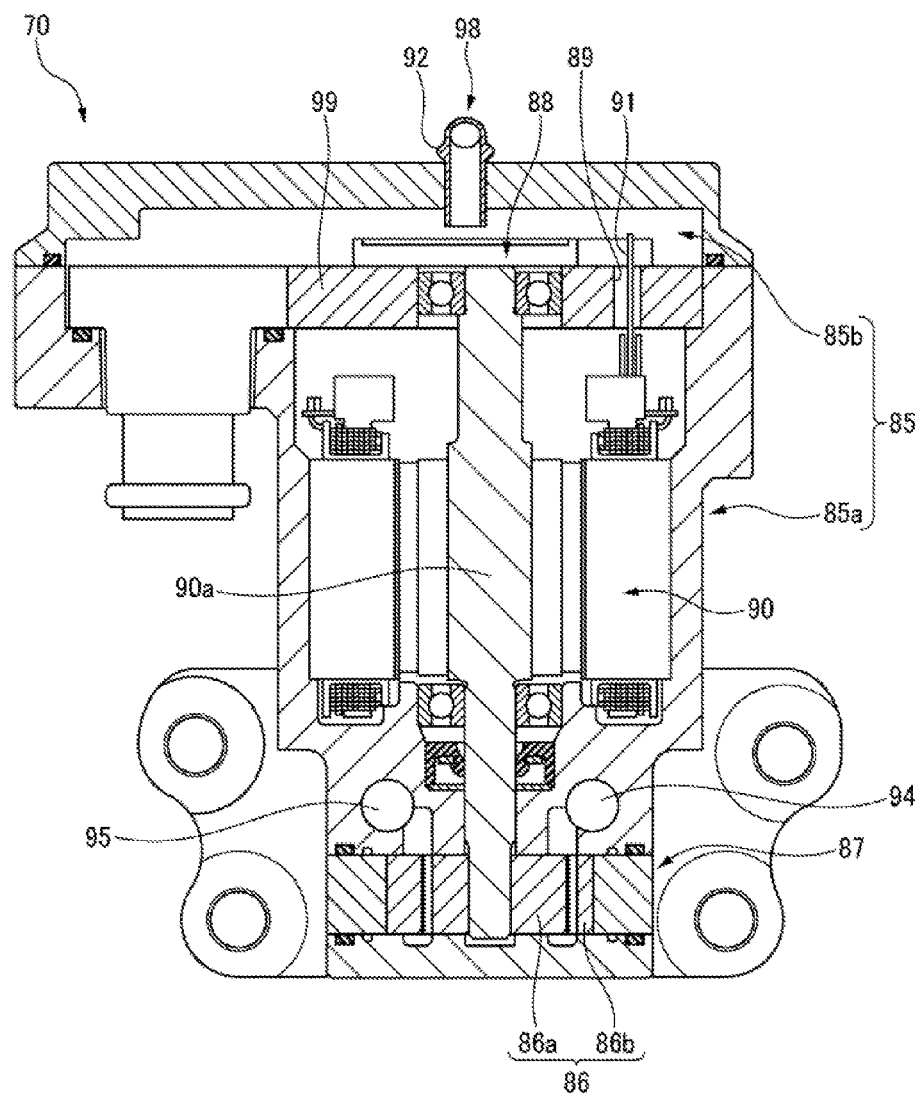
FIG. 8 is a schematic sectional view of the electric oil pump.

Also, referring to FIG. 7, the strainer 71 makes up an oil inlet path 94 together with the electric oil pump 70 and the lid member 72 and extends closer to the case side than the case fixing portion 72a of the lid member 72. The inlet port of the strainer 71 is positioned within the reservoir portion of the strainer accommodation chamber 105 in a mounted state where the lid member 72 is fixed to the case 11.

In addition, the electric oil pump 70 and the lid member 72 makes up an oil outlet path 95, through which oil sent under pressure from a pressure feed portion 87 of the electric oil pump 70, which will be described later, is sent to the hydraulic circuit formed between the lid member 72 and the oil path forming cover 96.

Two outlet pipes 97a, 97b are attached to the oil path forming cover 96, and the outlet pipes 97a, 97b are connected to a working chamber port 108a of a brake oil path, which will be described later, and a cooling/lubricating port 108b of an oil path for lubricating cooled and lubricated portions, respectively, the working chamber port 108a and cooling/lubricating port 108b being formed on the outer circumferential surface of the central case 11M in the strainer accommodation chamber 105.

The brake oil path (not shown) is formed in the case 11 so as to establish a communication from the working chamber port 108a to the working chamber S of the hydraulic brake 60, and oil discharged from the electric oil pump 70 is supplied. In addition, a front vertical oil path 109, as well as a left hand case oil path 110A and a right hand case oil path 110B are formed in the case 11. The front vertical oil path 109 extends from the cooling/lubricating port 108b in a vertical direction in front of the central case 11M. The left hand case oil path 110A and the right hand case oil path 110B branch off from the front vertical oil path 109. The left hand case oil path 110A is formed so that oil that passes through the left hand case oil path 110A cools a cooled portion A1 of the first motor 2A (for example, a coil of the stator 14A of the first motor 2A) and lubricates a lubricated portion A2 of the first motor 2A (for example, the bearing 19A of the first motor 2A) and is also formed so as to communicate with a left hand axle oil path 111A that is provided on the axle 10A. Then, oil that passes through the left hand axle oil path 111A lubricates a lubricated portion A3 of the first planetary gear type speed reducer 12A (for example, meshing portions of a needle bearing 31A and gears 21A, 22A, 23A, 24A of the first planetary gear type speed reducer 12A).

The right hand case oil path 110B is also formed so that oil that passes through the right hand case oil path 110B cools a cooled portion B1 of the second motor 2B (for example, a coil of the stator 14B of the second motor 2B) and lubricates a lubricated portion B2 of the second motor 2B (for example, the bearing 19B of the second motor 2B) and is also formed so as to communicate with a right hand axle oil path 111B that is provided on the axle 10B. Then, oil that passes through the right hand axle oil path 111B lubricates a lubricated portion B3 of the second planetary gear type speed reducer 12B (for example, meshing portions of a needle bearing 31B and gears 21B, 22B, 23B, 24B of the second planetary gear type speed reducer 12B).

Consequently, the front vertical oil path 109, the left hand case oil path 110A and the left hand axle oil path 111A which are formed within the case 11 make up a first cooling and lubricating path 130A which cools the cooled portion A1 and the lubricated portion A2 of the first motor 2A and the lubricated portion A3 of the first planetary gear type speed reducer 12A. The front vertical oil path 109, the right hand oil path 110B and the right hand axle oil path 111B which are formed within the case 11 make up a second cooling and lubricating path 130B which cools the cooled portion B1 and the lubricated portion B2 of the second motor 2B and the lubricated portion B3 of the second planetary gear type speed reducer 12B.

Retuning to FIGS. 6A to 8, the electric oil pump 70 has a motor portion 85 which accommodates a motor 90 which is a position sensorless, brushless DC motor and the pressure feed portion 87 which accommodates a trochoid pump 86 which is driven by the motor 90. This electric oil pump 70 is designed to operate in at least two modes of a high pressure mode and a low pressure mode and is controlled through PDI control. The pressure feed portion 87 is provided below the oil inlet path 94 and the oil outlet path 95 and discharges oil which flows in the inlet path 94 from the strainer 71 into the oil outlet path 95 while adjusting a discharge amount by rotating an inner rotor 86a connected to a rotational shaft 90a of the motor 90 and an outer rotor 86b.

The motor portion 85 has a main body accommodation portion 85a which accommodates the motor 90 and a control unit accommodation portion 85b that lies above the main body accommodation portion 85a and which accommodates a control member 88 for the motor 90. The main body accommodation portion 85a and the control unit accommodation portion 85b are allowed to communicate with each other by a communication hole 89 which is formed in a partition member 99. An electric wire 91 connecting the motor 90 and the control member 88 is disposed in the communication hole 89.

An atmosphere communicating mechanism 98 is provided in the electric oil pump 70 to establish a communication between an inside and an outside of the electric oil pump 70. This atmosphere communicating mechanism 98 is designed to release air in an inside of the main body accommodation portion 85a to the outside via the communication hole 89 and the control unit accommodation portion 85b so as to maintain an internal pressure of the electric oil pump 70 constant.

Figure 9:
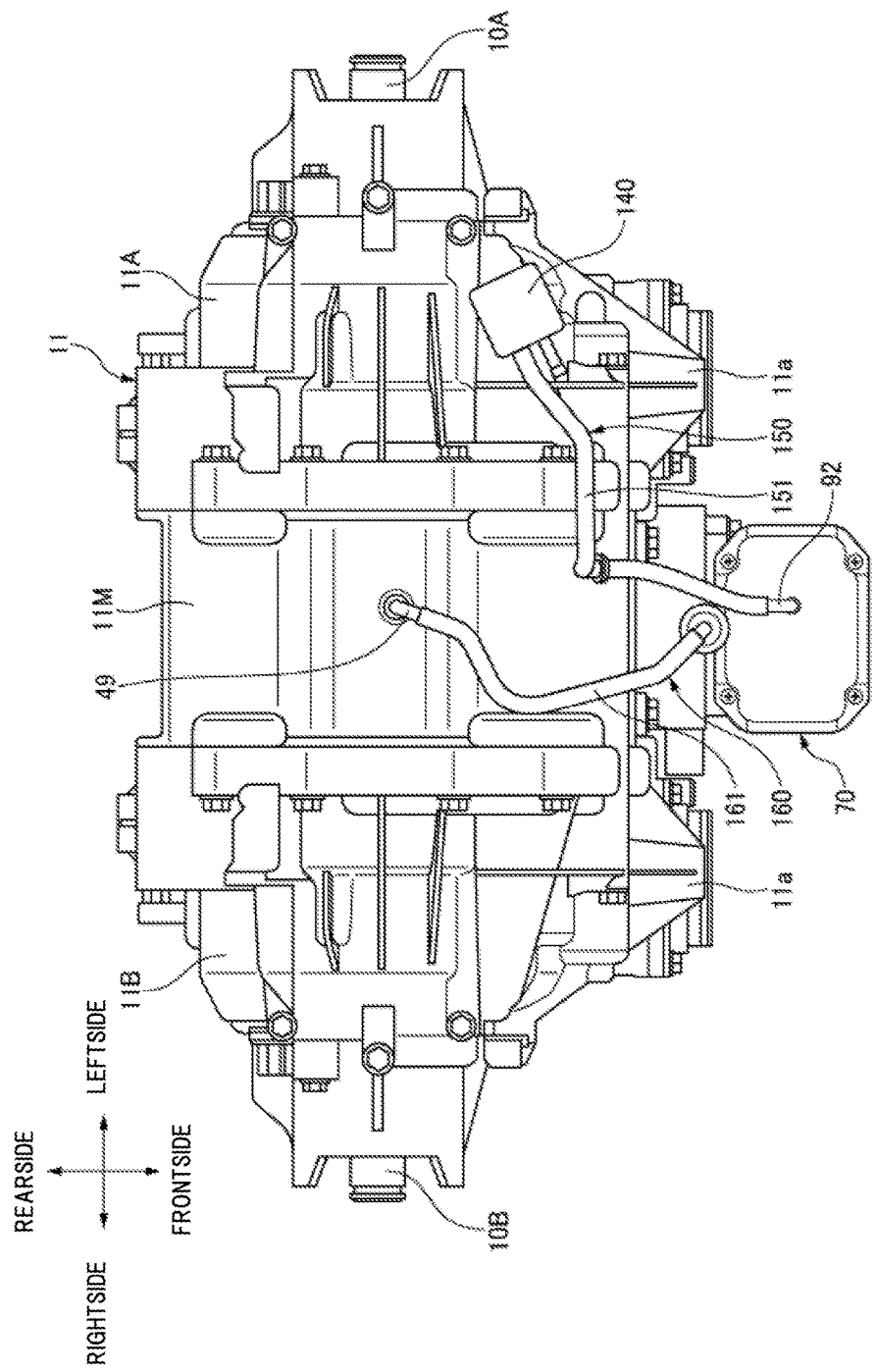
FIG. 9 is a top view of the rear wheel driving system including a first and second atmosphere communicating mechanisms.
Figure 10:
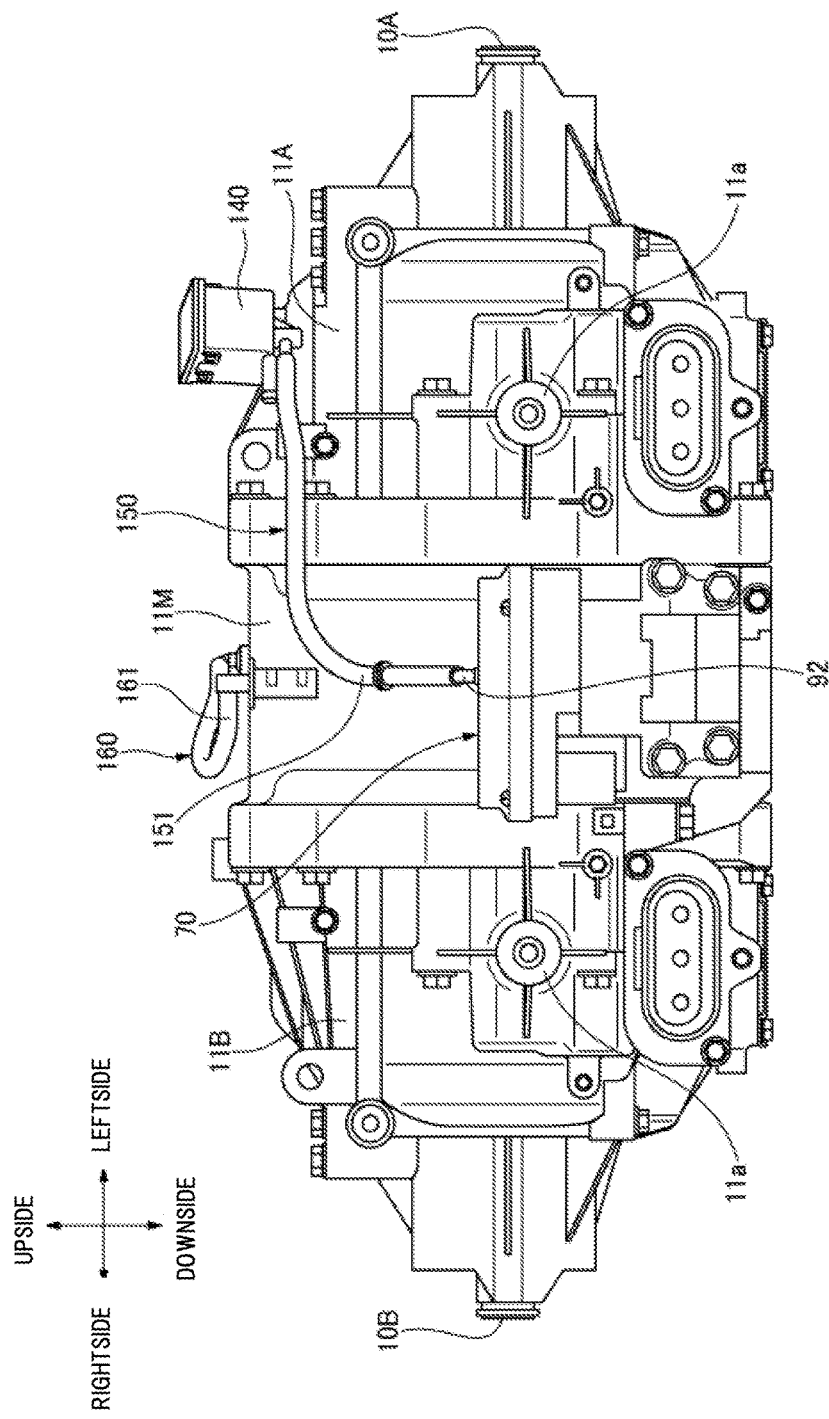
FIG. 10 is a front view of the rear wheel driving system including the first and second atmosphere communicating mechanisms.
Figure 11:
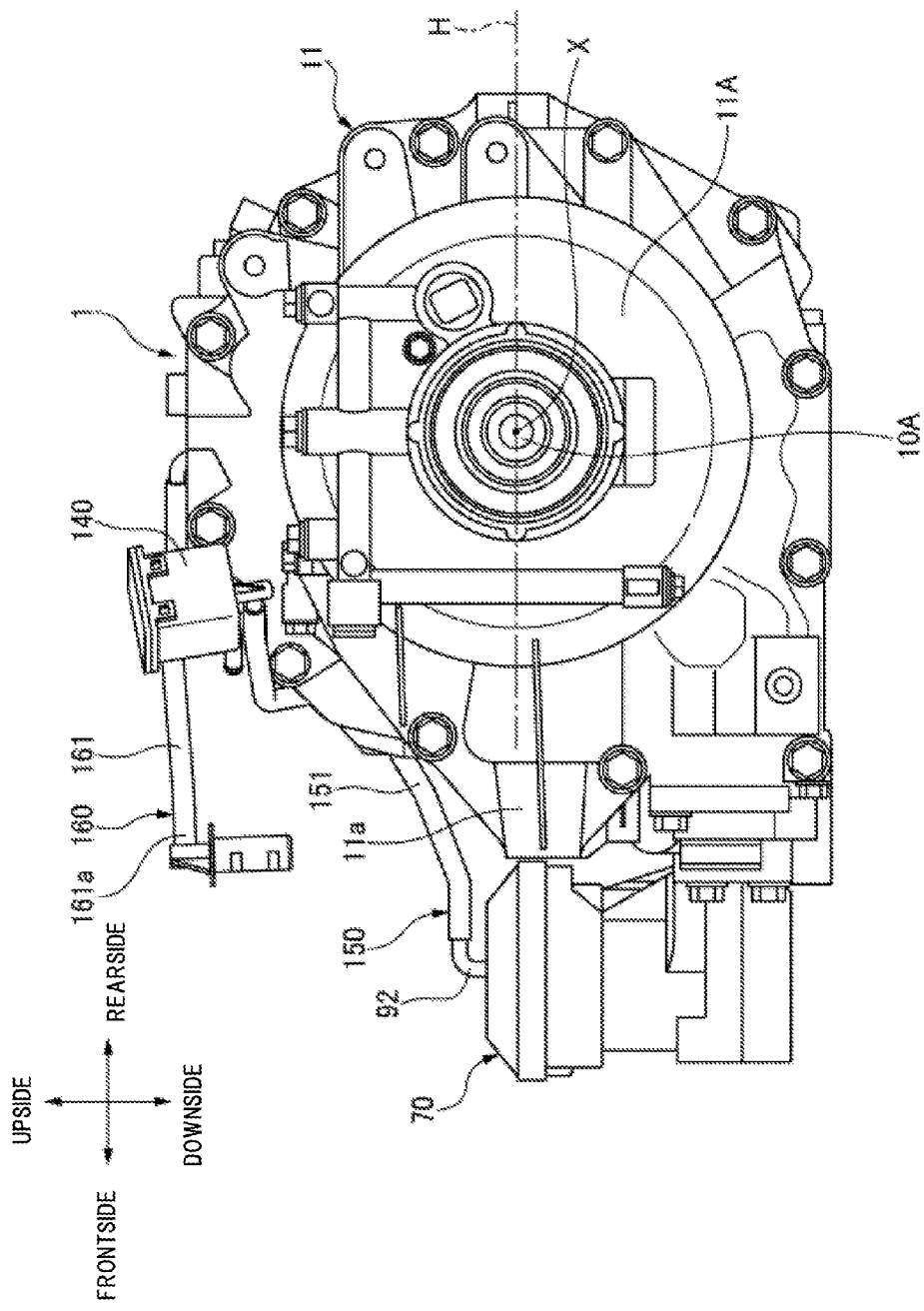
FIG. 11 is a side view of the rear wheel driving system including the first and second atmosphere communicating mechanisms.

An externally communicating pipe 92 is fitted in an upper portion of the control unit accommodating portion 85b. As shown in FIGS. 9 to 11, a hose 151 is connected to the externally communicating pipe 92, and a breather box 140 is attached to the other end side of the hose 151. Namely, the externally communicating pipe 92, the hose 151 and the breather box 140 make up an atmosphere communicating mechanism 150 which establishes a communication between the inside of the motor portion 85 and the atmosphere. This atmosphere communicating mechanism 150 is provided independently of the atmosphere communicating mechanism 160 described before.

The breather box 140 is fixed to the upper surface of the case 11 so as to be disposed apart from the electric oil pump 70 in a position which lies upwards of the electric oil pump 70. Namely, as shown in FIGS. 5 and 11, the strainer accommodation chamber 105 reserves oil below an imaginary horizontal plane H which passes through the rotational axis X of the first and second motors 2A, 2B and the first and second planetary gear type speed reducers 12A, 12B in order to recover and reserve more oil. Additionally, the electric oil pump 70 is disposed below the imaginary horizontal plane H in order to improve the oil supply efficiency by being positioned near the strainer accommodation chamber 105. On the other hand, the breather box 140 is disposed above the imaginary horizontal plane H to thereby be positioned farther away from the electric oil pump 70 to produce a greater difference in vertical position between the electric oil pump 70 and the breather box 140, thereby making it possible to improve the function of the breather box 140 as a breather. Further, since the breather box 140 is fixed only to the case 11, the breather box 140 can be handled as an integral part of the rear wheel driving system 1 when the rear wheel driving system 1 is attached to or detached from the subframe 13.

Figure 12:
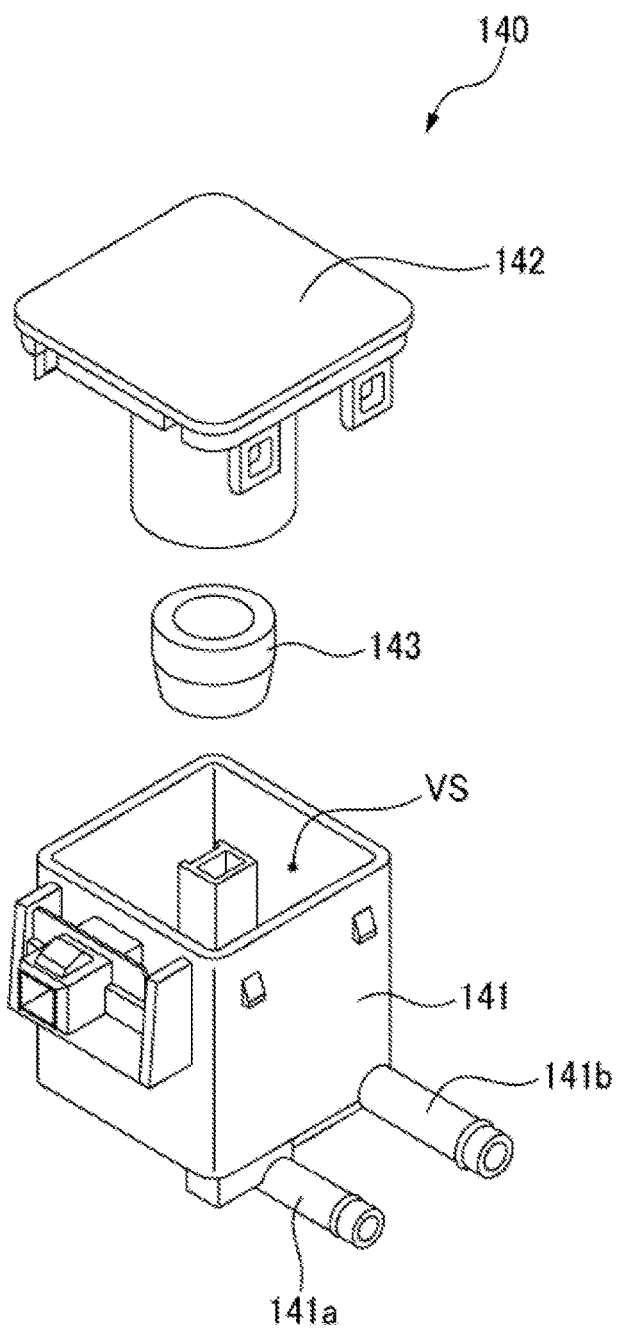
FIG. 12 is an exploded perspective view of a breather box.
Figure 13:
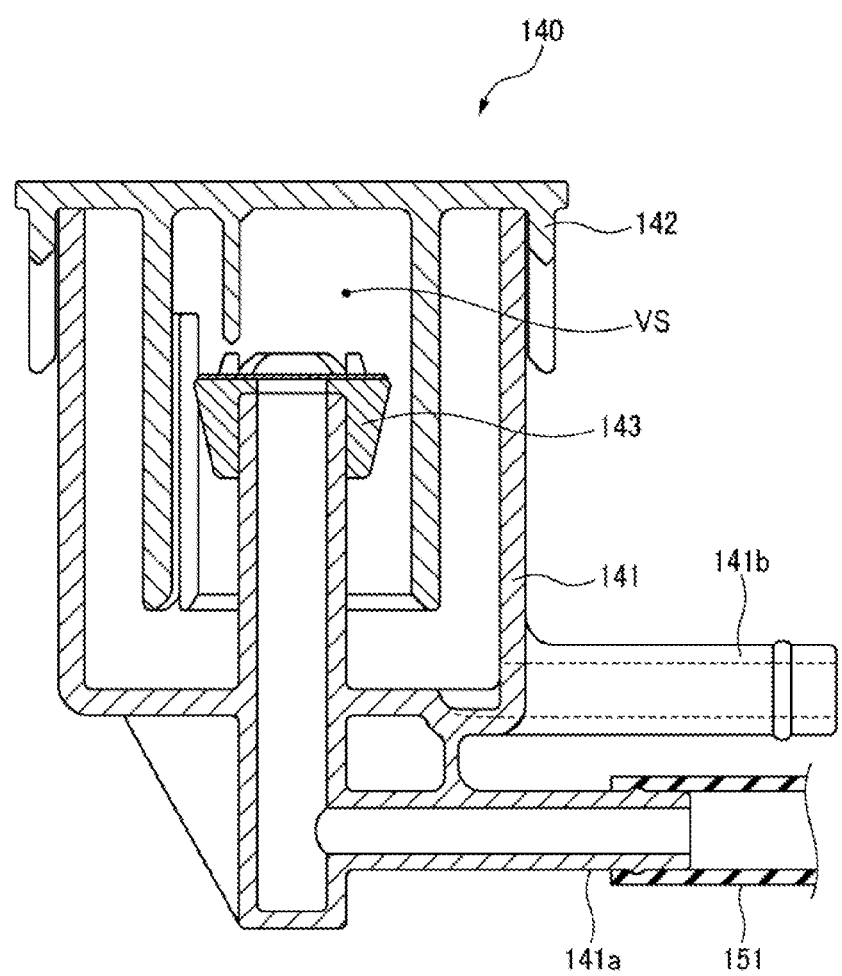
FIG. 13 is a sectional view of the breather box.

As shown in FIGS. 12 and 13, the breather box 140 has a case member 141 and a lid member 142 which make up the breather box 140. The case member 141 and the lid member 142 are connected to each other to define a predetermined volumetric space VS in an inside of the breather box 140. This volumetric space VS communicates with the inside of the motor portion 85 of the electric oil pump 70 by connecting the hose 151 to a first pipe portion 141a of the case member 141 which makes up an end portion of a passage inside the volumetric space VS. The volumetric space VS communicates with the atmosphere at a second pipe portion 141b of the case member 141 which makes up the other end portion of the passage inside the volumetric space VS. By adopting this configuration, since a breather volumetric chamber of the electric oil pump 70 is made up of the breather box 140 which is disposed separately from the electric oil pump 70 in the upper position, not only can the intrusion of water into the atmosphere communicating mechanism 98 be prevented, but also the breather volumetric chamber can be disposed in a more appropriate position.

A porus film member 143 is disposed in the middle of the passage inside the volumetric space VS, and this porus film member 143 is held by the case member 141 and the lid member 142. The porus film member 143 is a member that permits the passage of gas but prohibits the passage of liquid and solid and divides the volumetric space VS into a motor portion side and an atmosphere side. The porus film member 143 is disposed in the breather box 140 out of the atmosphere communicating mechanisms 98, 150 to thereby be allowed to prohibit the intrusion of liquid and solid to an upstream side of the porus film member 143 at the closer position to the atmosphere.

Thus, as has been described heretofore, the rear wheel driving system 1 of this embodiment includes further the breather box 140 that is disposed apart from the electric oil pump 70 in the position higher than the electric oil pump 70 and which has the predetermined volumetric space VS, and the volumetric space VS of the breather box 140 is in communication with the inside of the motor portion 85 of the electric oil pump 70 and is in communication with the atmosphere. By adopting this configuration, the volumetric space VS as the breather of the electric oil pump 70 is made up of the breather box 140 that is disposed separately from the electric oil pump 70 in the upper position. This prevents the intrusion of water into the atmosphere communicating mechanism 98 in an ensured fashion and allows the volumetric space VS to be disposed in a more appropriate position.

The breather box 140 is fixed to the case 11, and this allows the case 11, the electric oil pump 70 and the breather box 140 to be handled as an integral unit.

The case 11 has the strainer accommodation chamber 105 for reserving oil which is disposed below the imaginary horizontal plane H passing through the rotational axis X of the first and second motors 2A, 2B and the first and second planetary gear type speed reducers 12A, 12B. The electric oil pump 70 is disposed below the imaginary horizontal plane H, and the breather box 140 is disposed above the imaginary horizontal plane H. It is possible to recover and reserve more oil by disposing the strainer accommodation chamber 105 in such a lower position. Additionally, the oil supply efficiency is improved by disposing the electric oil pump 70 so close to the strainer accommodation chamber 105. Additionally, the great difference in vertical position is produced between the electric oil pump 70 and the breather box 140, and this can also improve the function as the breather.

The porus film member 143 is interposed between the atmosphere communicating paths 98, 150 which are made up of the motor portion 85, the breather box 140 and the hose 151 which allows the motor portion 85 to communicate with the breather box 140. The porus film member 143 permits the passage of gas but prohibits the passage of liquid and solid. By adopting this configuration, in addition to the prohibition of intrusion of liquid by the breather box 140 alone, the porus film member 143 can prohibit the intrusion of liquid and solid.

The porus film member 143 is disposed in the breather box 140 in the atmosphere communicating mechanisms, and this enables the porus film member 143 to be disposed in a closer position to the atmosphere, thereby making it possible to prohibit the intrusion of liquid and solid to the upstream side of the porus film member 143.

The breather box 140 has the case member 141 and the lid member 142 which are connected to each other to make up the breather box 140. The porus film member 143 is held by the case member 141 and the lid member 142 and divides the volumetric space VS into the motor portion side and the atmosphere side. By adopting this configuration, the porus film member 143 is disposed in the breather box 140 which is separate from the electric oil pump 70 and between the case member 141 and the lid member 142 which make up the breather box 140. This facilitates the fabrication and replacement of the porus film member 143.

The motor portion 85 includes the main body accommodation portion 85a which accommodates the motor 90 and the control unit accommodation portion 85b which accommodates the control member 88 for the motor 90. The main body portion 85a and the control unit accommodation portion 85b are caused to communicate with each other by the communication hole 89. The electric wire 91, which connects the motor 90 with the control member 88, is disposed in the communication hole 89. By adopting this configuration, the communication hole 89 can be used commonly as the space through which air in the inside of the atmosphere communicating mechanism 98 passes and the space where the electric wire 91 is laid out.

The case 11 is disposed below the floor panel of the vehicle, and this enables the expansion of a passenger accommodation space and a loading space which are provided above the floor panel.

The rear wheel driving system 1 of this embodiment includes separately and independently the atmosphere communicating mechanism 150 which allows the inside of the motor portion 85 of the electric oil pump 70 to communicate with the atmosphere and the atmosphere communicating mechanism 160 which allows the inside of the case 11 to communicate with the atmosphere. By adopting this configuration, although the electric oil pump 70 is fixed to the case 11 and is integrated with the rear wheel driving system 1, the function and performance that the rear wheel driving system 1 requires on the breather mechanism differ from those that the electric oil pump 70 requires on the breather mechanism. Thus, by providing the atmosphere communicating mechanisms 150, 160 separately and independently, the atmosphere communicating mechanisms 150, 160 can be given the required and sufficient functions and performances.

The case 11 is supported on the subframe 13 of the vehicle via the mount members 13a, 13b. The atmosphere communicating mechanism 150 is disposed apart from the inside of the motor portion 85 of the electric oil pump 70 in the position higher than the motor portion 85 and has the breather box 140 having the predetermined volumetric space VS. The breather box 140 is fixed to the case 11. By adopting this configuration, the atmosphere communicating mechanism 150 can be handled as the integral part of the rear wheel driving system 1. Namely, in the breather unit 40 of the rear wheel driving system 1, when a rear wheel driving system main body is mounted on or dismounted from the subframe 13, the mount members 13a, 13b have to be dismounted and mounted. Thus, there is not much advantage in integrating the atmosphere communicating mechanism 160 with the rear wheel driving system 1. However, there is much advantage in handling the atmosphere communicating mechanism 150 integrally with the rear wheel driving system 1 since the electric oil pump 70 is handled integrally with the rear wheel driving system 1.

Of the atmosphere communicating mechanism 150 and the atmosphere communicating mechanism 160, the porus film member 143, which permits the passage of gas but prohibits the passage of liquid and solid, is interposed only in the atmosphere communicating mechanism 150. By adopting this configuration, the intrusion of liquid and solid can be suppressed by the porus film member 143. Additionally, the atmosphere communicating mechanism 150 is arranged parallel to the atmosphere communicating mechanism 160, and therefore, also, the number of porus film members 143 can be limited to a required minimum.

The invention is not limited to the embodiment that has been described heretofore and hence can be modified or improved as required.

In the embodiment, while the porus film member 143 is disposed within the breather box 140, the invention is not limited thereto, and hence, the porus film member 143 may be disposed in anywhere along the atmosphere communicating path that is made up of the motor portion 85, the breather box 140 and the hose 151 that allows the motor portion 85 to communicate with the breather box 140.

In the embodiment, while the liquid medium supply unit is configured to supply the liquid medium to both the hydraulic chamber of the hydraulically driven disconnection/connection unit and the cooled or lubricated portion which is at least either the cooled portion or the lubricated portion of the power source or the cooled portion or the lubricated portion of the power transmission mechanism, the invention may be applied to a configuration in which the liquid medium supply unit supplies the liquid medium to either the hydraulic chamber or the cooled or lubricated portion.

The front wheel driving system 6 may be such that the motor 5 is used as an only drive source without using the internal combustion engine 4.

In the embodiment, the first case 11L is made up of the left hand case 11A and the central case 11M, and the second case 11R is made up of the right hand case 11B and the central case 11M. However, in the invention, the first case 11L is not limited to the configuration described above, provided that the first case 11 accommodates the first motor 2A and the first planetary gear type speed reducer 12A and has the left reservoir portion RL. In addition, the second case 11R is not limited to the configuration described above, provided that the second case 11R accommodates the second motor 2B and the second planetary gear type speed reducer 12B and has the right reservoir portion RR.

Further, in the embodiment shown in FIGS. 2 to 13, the first speed changer is disposed on the power transmission path between the left wheel and the first motor 2A, and the second speed changer is disposed on the power transmission path between the right wheel and the second motor 2B. However, the invention may be applied to a configuration in which only the first and second motors 2A, 2B are provided without providing the first and second speed changers.

The invention is described as employing oil as the liquid medium that is supplied for lubrication, however, other liquids may be used.

This patent application is based on Japanese Patent Application (No. 2013-249618) filed on Dec. 2, 2013, the contents of which are incorporated herein by reference.

DESCRIPTION OF REFERENCE NUMERALS AND CHARACTERS

1 rear wheel driving system (vehicle driving system)
2A first motor (drive source)
2B second motor (drive source)
3 vehicle
11 case (housing)
12A first planetary gear type speed reducer (power transmission mechanism)
12B second planetary gear type speed reducer (power transmission mechanism)
70 electric oil pump (liquid medium supply unit)
85 motor portion
85a main body accommodation portion
85b control unit accommodation portion
86 trochoid pump (pressure feed mechanism)
87 pressure feed portion
88 control member
89 communication hole
90 motor
91 electric wire
98 atmosphere communicating mechanism
105 strainer accommodation chamber (reservoir portion)
140 breather box (volumetric member)
141 case member (first member)
142 lid member (second member)
143 porus film member
150 atmosphere communicating mechanism (first atmosphere communicating mechanism)
151 hose (communicating member)
160 atmosphere communicating mechanism (second atmosphere communicating mechanism)
H imaginary horizontal plane
LWr left rear wheel (wheel)
RWr right rear wheel (wheel)

The invention claimed is:

1. A vehicle comprising:
a housing, which accommodates at least any one of a power source of the vehicle and a power transmission mechanism that is disposed on a power transmission path between a wheel of the vehicle and a power source of the vehicle; and
a liquid medium supply unit, which is fixed to the housing and which is driven by a motor to supply a liquid medium to a cooled or lubricated portion that is at least either of a cooled portion or a lubricated portion of the power source or a cooled portion or a lubricated portion of the power transmission mechanism, wherein:
the housing is supported on a framework member of the vehicle via a supporting member;
the liquid medium supply unit has a motor portion that accommodates the motor, and a pressure feed portion that accommodates a pressure feed mechanism driven by the motor;
the vehicle includes a first atmosphere communicating mechanism that establishes a communication between an inside of the motor portion of the liquid medium supply unit and atmosphere;

the first atmosphere communicating mechanism includes a volumetric member that is disposed apart from the liquid medium supply unit in a position higher than the liquid medium supply unit and that has a predetermined volumetric space, the volumetric member being fixed to the housing; and the first atmosphere communicating mechanism is in communication with the atmosphere through the volumetric member.

2. The vehicle according to claim 1, wherein:

the vehicle further includes, separately and independently from the first atmosphere communicating mechanism, a second atmosphere communicating mechanism that establishes a communication between an inside of the housing and the atmosphere; and the second atmosphere communicating mechanism has a member that is connected to the housing, an end portion opposite to the housing of the member being fixed to a hollow portion of the framework member having a closed section, and is in communication with the atmosphere through the hollow portion.

3. The vehicle according to claim 2, wherein a porus film member is interposed only in the first atmosphere communicating mechanism among the first atmosphere communicating mechanism and the second atmosphere communicating mechanism, the porus film member being configured to permit passage of gas but prohibit passage of liquid and solid.

4. The vehicle according to claim 3, wherein:

the housing has a reservoir portion, which reserves the liquid medium below an imaginary horizontal plane that passes through a rotational axis of the power source or the power transmission mechanism; and the liquid medium supply unit is disposed below the imaginary horizontal plane; and the volumetric member is disposed above the imaginary horizontal plane.

5. The vehicle according to claim 3, wherein the porus film member is disposed within the volumetric member in the atmosphere communicating mechanism.

6. The vehicle according to claim 5, wherein:

the volumetric member has a first member and a second member, which are connected to each other to form the volumetric member; and the porus film member is held by the first member and the second member and divides the volumetric space into a motor portion side and an atmosphere side.

7. The vehicle according to claim 1, wherein:

the motor portion includes a main body accommodation portion that accommodates a main body of the motor, and a control unit accommodation portion that accommodates a control member for the motor;

the main body accommodation portion and the control member accommodation portion communicate with each other via a communication hole; and an electric wire, which connects the main body of the motor with the control member, is disposed in the communication hole.

8. The vehicle according to claim 1, wherein the housing is disposed below a floor panel of the vehicle.

* * * * *